United States Patent Office
3,507,906
Patented Apr. 21, 1970

3,507,906
POLYESTERS, INTERMEDIATES THEREFOR, AND PROCESSES RELATING THERETO
Bryce C. Oxenrider, Florham Park, and Morton H. Litt and Ferdinand M. Slavik, Morristown, N.J., assignors to Allied Chemical Corporation, New York, N.Y., a corporation of New York
Original application Aug. 17, 1964, Ser. No. 389,849, now Patent No. 3,398,121. Divided and this application Mar. 19, 1968, Ser. No. 735,944
Int. Cl. C07c 69/86, 69/90
U.S. Cl. 260—479                                   2 Claims

ABSTRACT OF THE DISCLOSURE

This invention relates to alpha-(hydroxyphenyl) cumic acid esters and a method for their preparation. These compounds are useful as monomers in the preparation of polyester resins.

---

Figure 1:
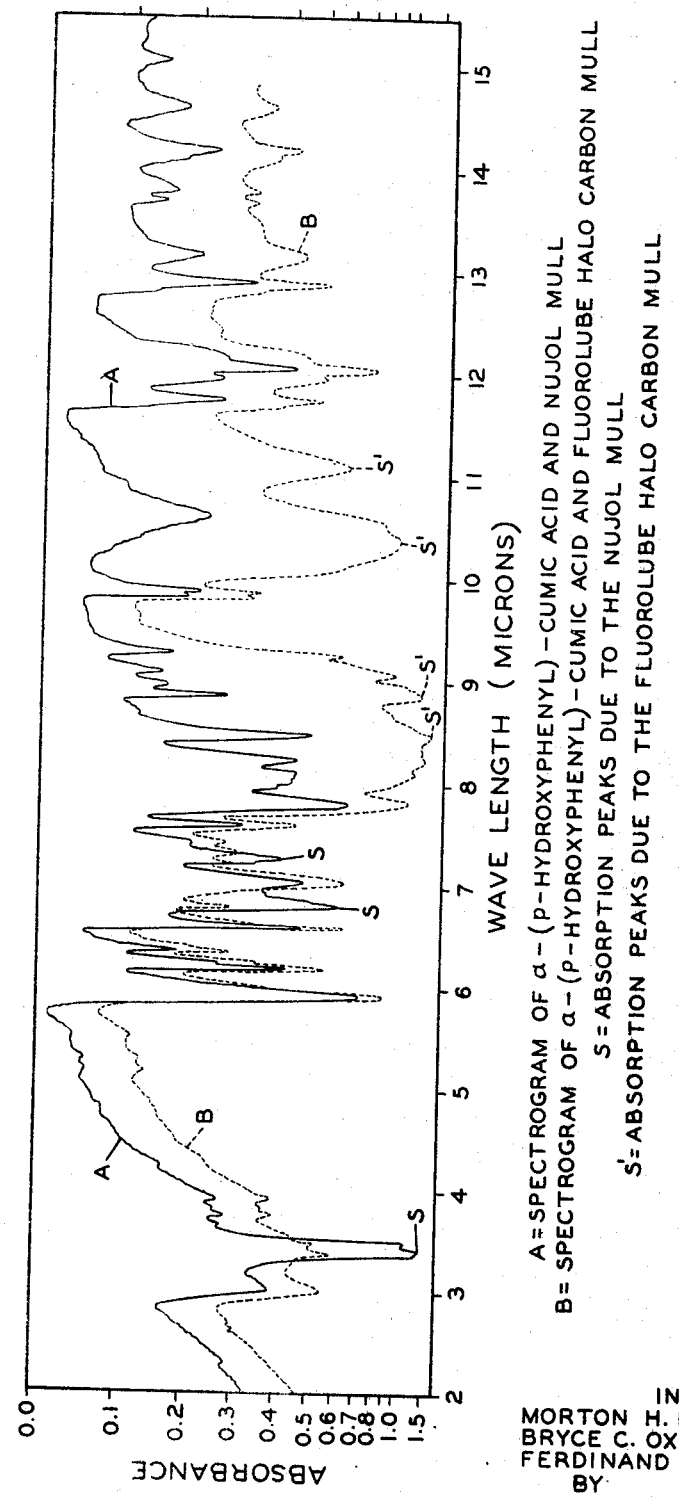

This is a division of application Ser. No. 389,849 filed Aug. 17, 1964, now matured to U.S. 3,398,121.

The hydroxy substituted aromatic acids and derivatives thereof of the present invention are compounds of the formula:

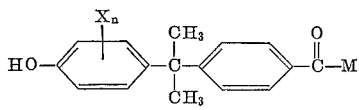

wherein X is a member selected from the group consisting of alkyl radicals having from 1 to 4 carbon atoms, chlorine and bromine, M is hydroxyl or a substitutent hydrolyzable thereto and $n$ is an integer from 0 to 4. Hydrolyzable substituents to the hydroxyl group include lower alkoxy groups e.g. the methyl ester, and the like. These compounds are useful as intermediates in the preparation of new polymeric materials as will be further illustrated herein. These compounds can be prepared by the condensation reaction of a monohydric phenol compound with an alpha substituted derivative of cumic acid or a compound hydrolyzable thereto as illustrated in the following equation.

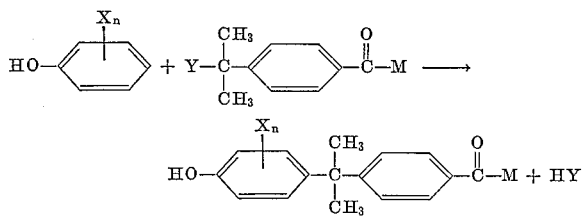

wherein X and $n$ have the meanings given above, the phenolic compound having a substitutable hydrogen atom present at the position para to the hydroxy substituent and Y is a member selected from the group consisting of hydroxy, bromine and chlorine. M having the meaning given above.

The reaction between the α-substituted cumic acid or hydrolyzable derivative thereto and the phenolic compound is preferably carried out in an inert solvent medium using an equal molar ratio of reactant or an excess of either reactant. We prefer, however, to obtain a liquid reaction medium simply by using an excess of the phenolic compound and conducting the reaction above the melting point of the phenolic compound. Use of an excess of phenolic compound rather than an excess of the α-substituted cumic acid or hydrolyzable derivative minimizes the formation of side products which result when α-substituted cumic acid or derivative hydrolyzable thereto reacts with the ring of the phenolic compound at more than one position. For the sake of clarity and brevity, it is to be understood that the term "cumic acid" or related terms include compounds hydrolyzable thereto as above set forth.

We have found in our reaction that when Y is bromine or chlorine, that the reaction liberates HCl or HBr as the case may be which acids are particularly appreciated as reaction products in that they increase the reaction rate of the phenolic compound with the α-substituted cumic acid. Hence, in our reaction we can, if desired, employ HCl or HBr as catalysts for the reaction, or employ α-chlorocumic acid or α-bromocumic acid as the reactant, in which case, addition of catalyst is not necessary.

This reaction is conducted above the melting point of the phenolic compound and up to and including its reflux temperature. Temperatures between about 45 and 180° C. are used in the case of phenol which melts at about 42° C. and refluxes at about 182° C. at atmospheric pressure.

The use of a substituted phenol having one or more substituents selected from the group consisting of alkyl radicals of 1 to 4 carbon atoms, chlorine and bromine at one or more of the ortho and/or meta positions results in a product having corresponding substitution on the hydroxyphenyl group. For instance, the use of o-cresol gives α-(3-methyl-4-hydroxyphenyl) cumic acid; 2,6-xylenol gives α-(3,5-dimethyl-4-hydroxyphenyl) cumic acid, while the use of o-bromophenol gives α-(3-bromo-4-hydroxyphenyl) cumic acid when following the manipulative procedure set forth in Example 1 herein. Alternatively, a chlorine or bromine substituted hydroxyphenyl cumic acid can be obtained by first obtaining α-(p-hydroxyphenyl) cumic acid by reaction of phenol with say, α-bromocumic acid and then post-chlorinating or post-brominating the product by conventional means, whereby the hydroxy substituent on the hydroxyphenyl group directs substitution of the halide atom to the ring of the hydroxyphenyl group. To prepare the α-substituted cumic acid reactant, α-hydroxycumic acid is prepared by the oxidation of cumic acid with 10MnO₄, while α-chlorocumic acid and α-bromocumic acid are prepared by reaction of cumic acid with chlorine and bromine, respectively. Compounds hydrolyzable to cumic acid can be prepared by conventional methods and can be reacted as above to prepare the α-substituted cumic acid reactant.

In order to illustrate the preparation of the new α-(hydroxyphenyl) cumic acid compound the following examples are presented.

EXAMPLE 1

240 grams of phenol were placed in a reaction vessel equipped with a gas inlet tube, stirring means, a thermometer and a condenser. The phenol was heated to 50° C. i.e., about 9° C., above its melting point and HCl gas was bubbled through the phenol until it became saturated as indicated by the phenol becoming straw colored. 50 grams of α-chlorocumic acid were added and the reaction was run at about 51° C. for 1¾ hours.

At completion of the reaction, the HCl which remained was removed by adding 100 cc. benzene to the reaction mixture and then distilling off the benzene. The phenol was then removed by distillation at a reduced pressure at about 12 mm. The distillation was stopped when the pot temperature reached 125° C. and the product was then purified by successive recrystallization from toluene giving 15.5 grams of a pale tan solid melting at 170.5–172.5° C. This product was confirmed to be α-(p-hydroxyphenyl) cumic acid by infrared absorption spectroscopy and elemental analysis. The elemental analysis was as follows:

Theoretical (percent): C, 74.98; H, 6.29; O, 18.73.
Found (percent): C, 74.60; H, 6.22; O, 19.18.

The infrared absorption spectrogram obtained using a Perkin-Elmer absorption spectrometer Model 21, NaCl prisms and a split mull is shown in FIGURE 1. The absorption peak at 3.0 microns indicates presence of a phenolic OH group in the compound while the peak at 3.4 microns indicates presence of alkyl groups; the peak at 5.9 microns indicates presence of a carboxyl group of an acid attached directly to an aromatic group, the peaks at 6.2 microns and 6.35 microns indicate presence of aromatic groups as does the peak at 6.6 microns. The absorption peak at 6.8 microns indicates presence of an alkyl group and the peaks at 7.2 and 7.4 microns are believed to be due to gem di-methyl groups i.e. 2 methyl groups on a single carbon atom. The peak at 12.05 microns indicates para substitution.

EXAMPLE 2

130 grams of phenol were placed in the same reaction vessel as used in Example 1. The phenol was heated to 50° C. and saturated with HCl. 24 grams of α-hydroxycumic acid were added and the reaction was run for four hours with HCl being added during the first forty-five minutes.

At the completion of the reactions, the HCl which remained was removed by adding 100 cc. of benzene to the reaction mixture and then distilling off the benzene. The phenol was then removed by distillation at a reduced pressure of about 12 mm. The distillation was stopped at a temperature of 125° C. and 100 cc. of toluene was added, resulting in the precipitation of a tan solid. After recrystallization from 265 cc. of toluene, 16.8 grams of product melting at 169.5–171° C. were obtained. This product was confirmed to be α-(p-hydroxyphenyl) cumic acid by elemental analysis. The elemental analysis was as follows:

Found (percent): C, 74.82; H, 6.29; O, 18.89.

EXAMPLE 3

164 grams of cumic acid and 900 cc. of carbon tetrachloride were charged into a 2 liter flask fitted with an agitator, condenser and a dropping funnel and irradiated by a sun lamp positioned ½ inch from the bottom of the flask. The reaction mixture was warmed to 30° C. and the sun lamp turned on. A solution of 160 grams of bromine in 100 cc. of carbon tetrachloride was added dropwise to the reaction mixture over a period of 3 hours until all but 4 grams of the bromine had been added, at which time an excess of bromine was present in the reaction mixture. The reaction mixture was cooled to 10° C. and the resulting precipitate recovered by filtration. After washing this precipitate with 300 cc. of cold carbon tetrachloride there was obtained 220 grams of α-bromocumic acid having a melting point of 160° C.

216 grams of the α-bromocumic acid were mixed with 1 liter of phenol and heated at 60° to 70° C. for two hours and then at 125° C. for one hour. The reaction mixture was cooled to 50° C. and 1 liter of benzene added. HBr was removed by washing with two 200 cc. quantities of water following which the reaction mixture was extracted three times with a total of 52.58 grams of NH₄OH in an aqueous solution containing 10% by weight NH₄OH. The extracts were neutralized with 10% sulfuric acid although any mineral acid can be used for the neutralization. Upon neutralization of the extracts, a precipitate formed which was recovered by filtration. The product thus obtained was 66 grams of α-(p-hydroxyphenyl) cumic acid having a melting point of 165° to 170° C. The benzene layer was then distilled first at atmospheric pressure to remove benzene and then at 4 mm. pressure up to a temperature of 125° C. to remove unreacted phenol. A dark purpose viscous oil remained after the distillation which was hydrolyzed with hot 20% NaOH and then neutralized with 10% H₂SO₄. A dark oil was produced which precipitated upon water extraction. After water washing and drying this precipitate there was obtained an additional 106 grams of α-(p-hydroxyphenyl) cumic acid.

As indicated above, those new compounds are useful in the production of monomers of new polyesters. These monomers are prepared by the esterification which is illustrated by the following equations:

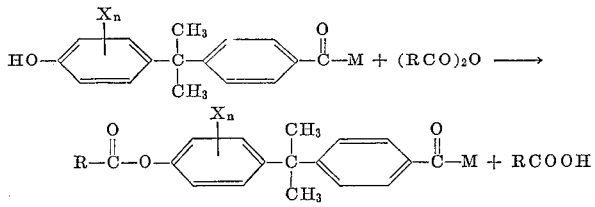

wherein R is an alkyl radical of 1 to 18 carbon atoms and X, n and M have the meanings given above for the α-(hydroxyphenyl) cumic acid. The esterification reaction is preferably carried out in an inert solvent such as pyridine at temperatures between about 25° C. and 150° C. Temperature below 25° C. cause the reaction rate to be substantially decreased and the production of the ester uneconomical. When pyridine or a similar compound is used as the inert solvent, the reaction is conveniently conducted at the reflux temperature of the reaction medium. The molar ratio in the reactants in the esterification is not critical and an excess of either reactant can be employed to drive the reactant to completion, or, although not desirable, stoichiometric amounts of anhydride can be employed relative to the α-(hydroxyphenyl) cumic acid. Preferably, an excess of the acid anhydride is employed with about 1.1 to 5 mols of anhydride being used per mol of the α-(hydroxyphenyl) cumic acid compound. When an excess of acid anhydride is employed the monomer can be conveniently recovered by hydrolyzing the excess anhydride with water, thereby causing the monomer to precipitate. Purification of the monomer can be effected by recrystallization from a solvent such as toluene. In order to illustrate the preparation of the new ester compounds such as α-(p-acetoxyphenyl) cumic acid the following example is set forth:

EXAMPLE 4

2 grams of α-(p-hydroxyphenyl) cumic acid, 2.16 grams acetic anhydride and 10 ml. pyridine were heated in a steam bath for one hour. The solution was then cooled in ice for one-half hour, following which it was poured into 50 ml. water and stirred for three hours to hydrolyze the excess acetic acid. Upon hydrolysis, a solid precipitated which was filtered, washed with water and then dried. The resulting white solid was purified by recrystallization from toluene and a 90% yield of product having a melting point of 161–162° C. was obtained. The structure of the compound was confirmed to be α-(p-acetoxyphenyl) cumic acid by infrared absorption spectroscopy and nuclear magnetic resonance. Elemental analysis of the product was as follows:

Theoretical (percent): C, 72.47; H, 6.08. Found (percent): C, 72.15; H, 6.15.

The spectrum was obtained in CDCl₃ (D representing deuterium) for the nuclear magnetic resonance tests. Chemical shifts for the various types of protons are illustrated in parts per million from tetramethyl silane in the following table:

P.p.m. (of magnetic field strength)
(a) 7.20 and 7.33
(b) 7.90 and 8.03
(c) 7.06 and 7.20
(d) 6.83 and 6.97
(e) 2.24
(f) 1.67
(g) 12.2

The apparatus employed was a Varian A–60 nuclear magnetic resonance spectrometer (60 magacycles).

Figure 2:
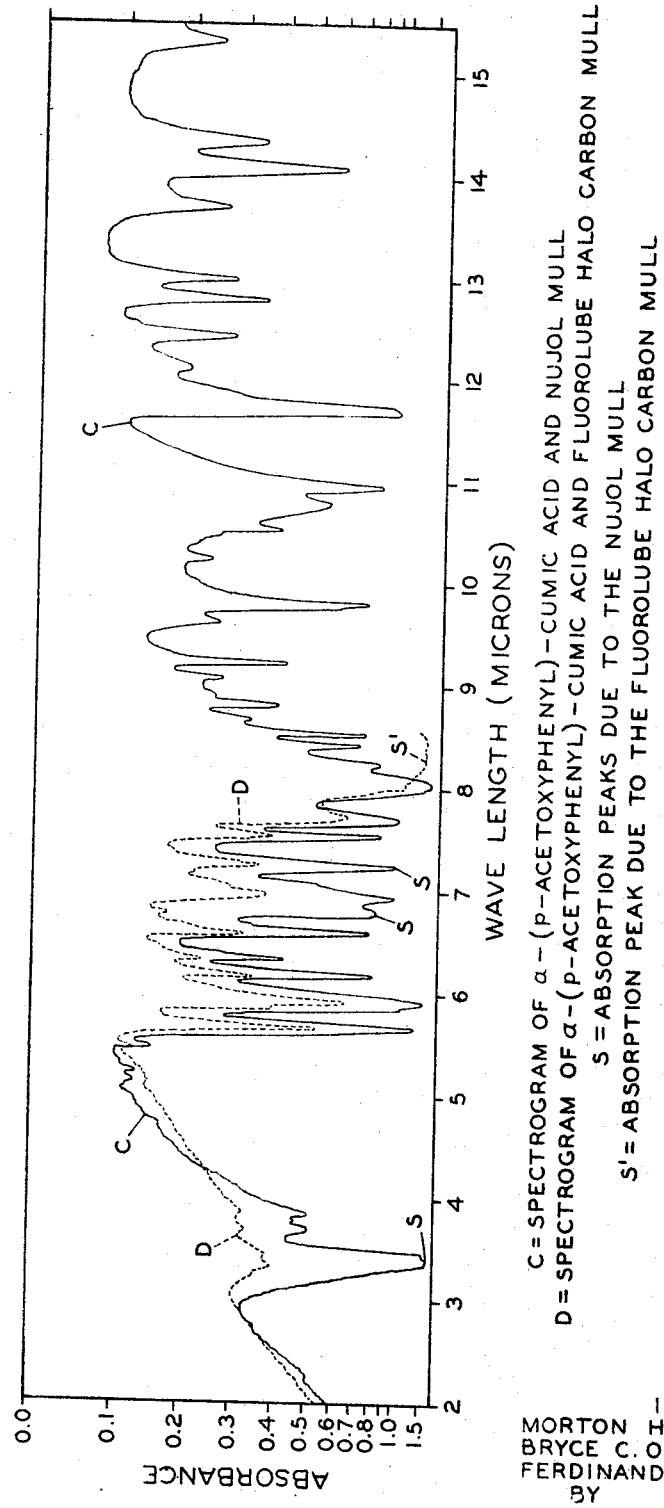

The infrared absorption spectrogram of the compound which spectrogram was obtained using a Perkin-Elmer absorption spectrometer Model 21, NaCl prisms and a split mull is shown in FIGURE 2. The absorption peaks at 3.3 and 3.4 microns indicate presence in the compound of an aliphatic group while the absence of a peak at 3.0 microns indicates absence of the phenolic OH group present in α-(p-hydroxyphenyl) cumic acid. The peak at 5.7 microns indicates presence of an acetoxy group while the peak at 5.9 microns is due to the presence of a C=O group of an acid attached directly to an aromatic ring in the compound. Peaks at 6.2 and 6.6 microns are due to the presence of aromatic bonds in the compound while the peak at about 7.2 microns indicates methyl group absorption. The peak at about 11.7 microns indicates para substitution.

By substituting, in place of the α-(p-hydroxyphenyl) cumic acid of Example 1, α-(3-bromo-4-hydroxyphenyl) cumic acid there is obtained upon the reaction with acetic anhydride α-(3-bromo-4-acetoxyphenyl) cumic acid when following the procedure of Example 4. Likewise, when α-(3-methyl-4-hydroxyphenyl) cumic acid is reacted in the manner of Example 4 with acetic anhydride there is obtained α-(3-methyl-4-acetoxyphenyl) cumic acid and when α-(3-chloro-4-hydroxyphenyl) cumic acid is reacted following the same manipulative procedure of Example 4, there is obtained the corresponding substituted α-(p-hydroxyphenyl) cumic acid i.e., α-(3-chloro-4-acetoxyphenyl) cumic acid.

The polyesters which can be produced by polymerizing the alkyl esters, we have found, possess high glass transition temperatures and because of this particular property the polyester polymers are particularly useful in heat resistant films and fibers. This is considered a significant advance over prior art polyesters produced by the reaction of difunctional acids or their ester derivatives with dihydric alcohols. These polyesters are generally characterized by low glass transition temperatures of about 50 to 100° C. making them unsuitable for high temperature applications.

The polyester polymers of this invention are composed of recurring units of the formula:

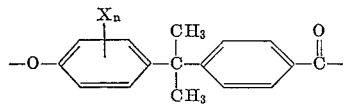

wherein X and n have the meanings given above with respect to the hydroxyphenyl cumic acids and esters of alkyl acids. The polyester polymers of this invention are prepared by the polymerization of the above ester intermediates in the presence of a catalyst which polymerizes diesters with glycols. These catalysts are a known class; they are generally selected from the group consisting of group V metal oxides, sodium alkoxytitanates, tetraalkyltitanate esters, alkaline earth salts of weak acids and metallic magnesium. Optimum results in the polymerization of the ester intermediates are obtained using metallic magnesium as the catalyst. Metallic magnesium is further preferred because some of the organic metallic compounds above mentioned are considerably more expensive than metallic magnesium.

The temperature of the polymerization is above the melting point of the monomer and the reaction is terminated above the flow point of the polymer. Generally, and especially in the case where α-(p-acetoxyphenyl) cumic acid is polymerized, the temperature of the polymerization will be in the range of 165 to 400° C. During the reaction, acid is formed as a side product and vaporizes and can be removed from the system. Since this acid is undesirable in the reaction medium it is preferred to operate the polymerization under conditions which will readily vaporize the acid and remove it from the reaction medium. Such conditions include use of reduced pressures. Since the reaction mixture becomes more viscous as the reaction proceeds, the pressure in the system can be progressively reduced to aid in the removal of the acid vapors.

Our polymerization is preferably performed in an inert atmosphere and in the absence of water since air or substantial atmospheric moisture can have some deleterious effect upon the reaction or the products obtained thereby. This is especially true when the reaction is performed at higher temperatures, say temperatures substantially above the flow point of the resultant polymer.

Our new polyester polymers have, as indicated above, high glass transition temperatures which in the case of polymers produced from α-(p-acetoxyphenyl) cumic acid are over 200° C. These high transition temperatures of the polymer make them very useful as heat resistant films and fibers. The polymers are soluble in m-cresol, sym. tetrachloroethane and o-dichlorobenzene and thus can be processed by using a solution of the polyester in one of these solvents. The term "glass transition temperature" of the polyester resin as used herein, refers to a second order transition temperature which can be determined by plotting the apparent modulus of rigidity of a sample as a function of temperature and can be defined as the temperature at which the apparent modulus of rigidity of the sample possesses a value of $1.45 \times 10^4$ p.s.i.g. This determination can be made in accordance with ASTM test D–1043–61T.

Polymers of α-(p-acetoxyphenyl) cumic acid according to our invention can have a wide range of molecular weights as determined by inherent viscosity. Where reference is made herein to inherent viscosity, it is determined by first determining the relative viscosity in an Ostwald Viscometer tube on .5 gram of polymer in a 100 ml. solution of m-cresol at 30° C. and the inherent viscosity is reported in deciliters per gram (dl./g.). Generally, polymers having an inherent viscosity between .5 dl./g. and 2 dl./g. are particularly useful. Polymers of α-(p-acetoxyphenyl) cumic acid with an inherent viscosity between .75 dl/g. and 2 dl./g. can be spun into fibers using either solvent spinning methods or melt spinning methods. In the case of solvent spinning the fiber, either the wet spinning or so-called dry or evaporative spinning method can be suitably employed. Suitable solvents of the polymer include m-cresol, sym. tetrachloroethane and o-dichlorobenzene and when wet spun, the fibers can be formed in a non solvent of the polymer but a solvent of the spinning solution. The fibers are highly heat resistant due to their high glass transition temperature, about 200° C. and higher. Polymers of α-(p-acetoxyphenyl) cumic acid having an inherent viscosity between .5 dl./g. and 1 dl./g. are capable of being molded by conventional molding operations into products having a high dimensional stability up to temperatures of about 218° C.

In order to illustrate a method of preparing our new polyester polymers produced from the new ester intermediates such as α-(p-acetoxyphenyl) cumic acid the following example is presented:

EXAMPLE 5

To a 100 ml. capacity resin pot equipped with heating and stirring means and kept under nitrogen atmosphere, were added 30 grams of α-(p-acetoxyphenyl) cumic acid and .003 gram of metallic magnesium. The charge was reacted over a five hour period employing the following pressure-temperature-time cycle:

| Time, hours | Pressure, mm. Hg | Temperature, °C |
|---|---|---|
| 0.00 | 760 | 183 |
| 1.00 | 220 | 183 |
| 1.50 | 160 | 182 |
| 2.00 | 100 | 182 |
| 2.50 | 50 | 183 |
| 3.00 | 25 | 183 |
| 3.25 | 25 | 200 |
| 3.50 | .05 | 200 |
| 3.75 | .05 | 350 |
| 5.00 | .02 | 350 |

Acetic acid was removed as the reaction by-product during the course of the reaction, due to the decrease in the pressure over the reaction period. At the end of five hours the reaction mixture was cooled to room temperature under nitrogen atmosphere and the caramel colored mass was dissolved in 500 ml. of tetrachloroethane. The polymer solution was washed with 2% HCl and then with 100 ml. portions of deionized water to remove residual HCl. After filtering the solution the polymer was precipitated by adding the solution to 3 liters of acetone while stirring. The mother liquor was decanted and the residual tetrachloroethane was extracted from the precipitate with acetone. The polymer was dried overnight in a vacuum oven at 60° C. under reduced pressure of the 2 mm. Hg.

16 grams of polymer were recovered and the inherent viscosity of the polymer was determined to be 0.76 deciliter per gram. The inherent viscosity was determined as above. The polymer was off-white in color and had a "number average molecular weight" of 11,800 as determined on a Mechrolab Vapor Pressure Osmometer Model 302 at 130° C. in 1.0 and 1.7% solutions in dichlorobenzene. The glass transition temperature of the polymer determined as above outlined using ASTM test D–1043–61T was 218° C.

The flow point of the polymer was determined to be in the range of 285° to 300° C. The flow point was determine by placing a sample of the polymer in a hot-stage microscope, i.e. a microscope mounted on top of a heating mantle, and subjecting the polymer to gradually increasing heat until it was noted through the microscope that the sample started to flow. At that point, the polymer had reached its flow point.

In accordance with the above procedure and Example 5 there can be prepared polymers of the alkyl ester wherein the phenyl substituent of the cumic acid compound has an additional ring substituent. For instance, poly α-(3-bromo-4-acetoxyphenyl) cumic acid; poly α-(3-chloro-4-propoxyphenyl) cumic acid from α-(3-chloro-4-propoxyphenyl) cumic acid or poly α-(3-methyl-4-acetoxyphenyl) cumic acid from α-(3-methyl-4-acetoxyphenyl) cumic acid or copolymers can be prepared from mixtures of the above or similar monomers. Moreover, the monomers of this invention can be copolymerized with other known monomers providing reactive oxy and carboxy groups such as m- or p-hydroxybenzoic acid, 6-hydroxycaproic acid, or mixtures of terephthalic acid or its methyl ester with a glycol such as ethylene glycol in roughly a 1:1 mol ratio by following the same procedure illustrated above.

From the foregoing, it is readily apparent that we have provided new and useful cumic acid compounds, polyester cumic acid monomers and valuable polymers of the same together with the respective processes for their production which are of significant value to the industry, the polymers being useful as heat resistant films or fibers and being characterized by a high glass transition temperature.

Many modifications and variations of this invention will become apparent to those skilled in the art from the teachings herein and thus the invention should be construed in the light of its spirit and scope using the appended claims as a guide thereto.

We claim:
1. An ester compound of the formula:

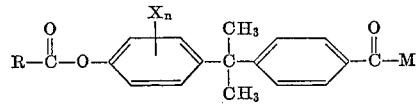

wherein R is a lower alkyl radical, X is a member selected from the group consisting of alkyl radicals of 1 to 4 carbon atoms, chlorine and bromine, $n$ is an integer from 0 to 4, and M is selected from the class consisting an hydroxyl group and lower alkoxy groups.

2. α-(p-acetoxyphenyl)cumic acid.

References Cited

UNITED STATES PATENTS 2,374,949   5/1945   Niederl _____ 260—479
3,206,501   9/1965   Masuda _____ 260—479

OTHER REFERENCES

Baker et al., Journal of Chem. Soc., 1952, pp. 1447–8.
Morrison et al., Organic Chemistry, pp. 482–3, Allyn & Bacon Inc., Boston (1959).

JAMES A. PATTEN, Primary Examiner

U.S. Cl. X.R.
260—473, 524, 515

PO-1050
(5/69)

UNITED STATES PATENT OFFICE
CERTIFICATE OF CORRECTION

Patent No. 3,507,906      Dated April 21, 1970

Inventor(s) Bryce C. Oxenrider, Morton H. Litt, Ferdinand M. Slavik

It is certified that error appears in the above-identified patent and that said Letters Patent are hereby corrected as shown below:

Column 1, line 63, "reactant" should be --reactants--.

Column 2, line 40, "10MnO$_4$" should be KMnO$_4$--.

Column 3, line 69, "purpose" should be --purple--.

Column 4, line 19, "Temperature" should be --Temperatures--.

Column 7, line 25, "determine" should be --determined--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents